(12) United States Patent
Bae et al.

(10) Patent No.: US 10,594,141 B2
(45) Date of Patent: Mar. 17, 2020

(54) SOFT MAGNETIC ALLOY, WIRELESS POWER TRANSMITTING APPARATUS, AND WIRELESS POWER RECEIVING APPARATUS INCLUDING THE SAME

(71) Applicant: LG INNOTEK CO., LTD., Seoul (KR)

(72) Inventors: Seok Bae, Seoul (KR); Ji Yeon Song, Seoul (KR); Won Ha Moon, Seoul (KR); Jai Hoon Yeom, Seoul (KR); Sang Won Lee, Seoul (KR); Jong Hyuk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 764 days.

(21) Appl. No.: 14/943,286

(22) Filed: Nov. 17, 2015

(65) Prior Publication Data

US 2016/0141888 A1    May 19, 2016

(30) Foreign Application Priority Data

Nov. 17, 2014  (KR) .................. 10-2014-0160234

(51) Int. Cl.
*C22C 45/02* (2006.01)
*C22C 38/02* (2006.01)
*C22C 38/00* (2006.01)
*C22C 38/06* (2006.01)
*H02J 5/00* (2016.01)
(Continued)

(52) U.S. Cl.
CPC ............ *H02J 5/005* (2013.01); *C22C 38/002* (2013.01); *C22C 38/02* (2013.01); *C22C 38/06* (2013.01); *C22C 45/02* (2013.01); *H01F 1/15308* (2013.01); *H01F 38/14* (2013.01); *H02J 7/025* (2013.01)

(58) Field of Classification Search
None
See application file for complete search history.

(56) References Cited

U.S. PATENT DOCUMENTS

| 5,496,418 A * | 3/1996 | Ramanan ............... C22C 45/02 148/304 |
| 5,626,690 A | 5/1997 | Matsuki et al. |

(Continued)

FOREIGN PATENT DOCUMENTS

| CN | 203261137 U | 10/2013 |
| CN | 104011814 A | 8/2014 |

(Continued)

OTHER PUBLICATIONS

Makino (IEEE Transactions on Magnetics, 2012, vol. 48, p. 1331-1335). (Year: 2012).*

(Continued)

*Primary Examiner* — Xiaowei Su
(74) *Attorney, Agent, or Firm* — Saliwanchik, Lloyd & Eisenschenk

(57) ABSTRACT

The present invention relates to a soft magnetic alloy and, more specifically, to a soft magnetic alloy used in electric transformers, pulse generators, compressions, electric chokes, energy-accumulating inductors, magnetic sensors, or the like, and a wireless power transmitting apparatus and wireless power receiving apparatus including the soft magnetic alloy.

3 Claims, 4 Drawing Sheets

(51) Int. Cl.
*H02J 7/02* (2016.01)
*H01F 1/153* (2006.01)
*H01F 38/14* (2006.01)

(56) References Cited

U.S. PATENT DOCUMENTS

2012/0154084 A1* 6/2012 Yoshizawa .............. C22C 38/02
  335/297
2015/0123604 A1 5/2015 Lee et al.
2015/0325365 A1* 11/2015 Song ........................ H01F 38/14
  307/104

FOREIGN PATENT DOCUMENTS

EP 0986073 A1 3/2000
EP 2797092 A1 10/2014

OTHER PUBLICATIONS

Katakam (Scripta Materialia, 2012, vol. 66, p. 538-541). (Year: 2012).*
Partial European Search Report dated Apr. 25, 2016 in European Application No. 15194681.1.
Office Action dated Jun. 5, 2018 in Chinese Application No. 201510792460.7.

* cited by examiner

SOFT MAGNETIC ALLOY, WIRELESS POWER TRANSMITTING APPARATUS, AND WIRELESS POWER RECEIVING APPARATUS INCLUDING THE SAME

CROSS-REFERENCE TO RELATED APPLICATION

This application claims the benefit under 35 U.S.C. § 119 of Korean Patent Application No. 10-2014-0160234, filed Nov. 17, 2014, which is hereby incorporated by reference in its entirety.

BACKGROUND

1. Field of the Invention

The present invention relates to a soft magnetic alloy and, more specifically, to a soft magnetic alloy used in electric transformers, pulse generators, compressions, electric chokes, energy-accumulating inductors, magnetic sensors, or the like, and a wireless power transmitting apparatus and wireless power receiving apparatus including the soft magnetic alloy.

2. Discussion of Related Art

A wireless power transmitting apparatus is connected to a power source, and includes a metal substrate, a soft magnetic sheet disposed on the metal substrate, and a transmission coil disposed on the soft magnetic sheet. In addition, a wireless power receiving apparatus is connected to a load, and includes a soft magnetic sheet and a reception coil disposed on the soft magnetic sheet.

Here, the soft magnetic sheet of the wireless power transmitting apparatus, and the soft magnetic sheet of the wireless power receiving apparatus may shield electromagnetic waves radiated from the transmission coil and electromagnetic waves received by the reception coil, respectively. Accordingly, an energy loss occurring between the wireless power transmitting apparatus and the wireless power receiving apparatus may be minimized, and a power transmitting and receiving efficiency may be improved.

Normally, Fe-based soft magnetic alloys may be used as shielding materials. The Fe-based soft magnetic alloys may be classified into, for example, an Fe—Si soft magnetic alloy, an amorphous soft magnetic alloy, and a nanocrystal soft magnetic alloy, etc. The Fe—Si soft magnetic alloy may be usable at a low frequency band of about 10 kHz since it has a low resistivity, although it has a high saturated magnetic flux density in the range of 1.5 T to 1.9 T. Accordingly, the Fe—Si soft magnetic alloy may not be applicable to a wireless charging system using a frequency band in the range of 110 to 250 kHz. The amorphous soft magnetic alloy or nanocrystal soft magnetic alloy including Fe, a ferromagnetic element, and a metalloid element may be used at a frequency band in the range of 110 to 250 kHz. However, since the soft magnetic alloy including Fe and a metalloid element has a low saturated magnetic flux density of 1.56 T or less, it is difficult to be thinned and manufacturing costs thereof may increase.

BRIEF SUMMARY

The present invention is directed to an Fe-based soft magnetic alloy having a high saturated magnetic flux density, a low AC magnetic loss, and a high magnetic stability at an operating temperature, and a wireless power transmitting apparatus and wireless power receiving apparatus including the soft magnetic alloy.

According to an aspect of the present invention, a soft magnetic alloy has a composition expressed by a Formula below.

$$Fe_aX_bY_c \quad \text{[Formula]}$$

Here, the X and Y represent metalloid elements, and a content of the metalloid elements is in the range of 9 to 15.5 at %.

The metalloid elements may include at least one of B, C, Al, Si, P, Ga, and Ge.

The X may include B, and the Y may include Si.

The a may be in the range of 84.5 to 91.2 at %, the b may be in the range of 2.0 to 9.0 at %, and the c may be in the range of 3.0 to 12.0 at %.

The amount of saturated magnetic induction of the soft magnetic alloy may be 1.7 T or more, and a resistivity of the soft magnetic alloy may be 30μΩ·cm or more.

The soft magnetic alloy may be thermally treated by annealing at a temperature between 350° C. and 400° C.

According to another aspect of the present invention, a wireless power transmitting apparatus of a wireless charging system includes a soft magnetic sheet and a transmission coil formed on the soft magnetic sheet. The soft magnetic sheet includes a soft magnetic alloy having a composition expressed by a Formula below.

$$Fe_aX_bY_c \quad \text{[Formula]}$$

Here, the X and Y represent metalloid elements, and a content of the metalloid elements is in the range of 9 to 15.5 at %.

According to still another aspect of the present invention, a wireless power transmitting apparatus of a wireless charging system includes a soft magnetic sheet and a reception coil formed on the soft magnetic sheet. The soft magnetic sheet includes a soft magnetic alloy having a composition expressed by a Formula below.

$$Fe_aX_bY_c \quad \text{[Formula]}$$

Here, the X and Y represent metalloid elements, and a content of the metalloid elements is in the range of 9 to 15.5 at %.

BRIEF DESCRIPTION OF THE DRAWINGS

The above and other subjects, features, and advantages of the present invention will become more apparent to those of ordinary skill in the art by describing in detail exemplary embodiments thereof with reference to the accompanying drawings, in which.

DETAILED DESCRIPTION

Figure 1:
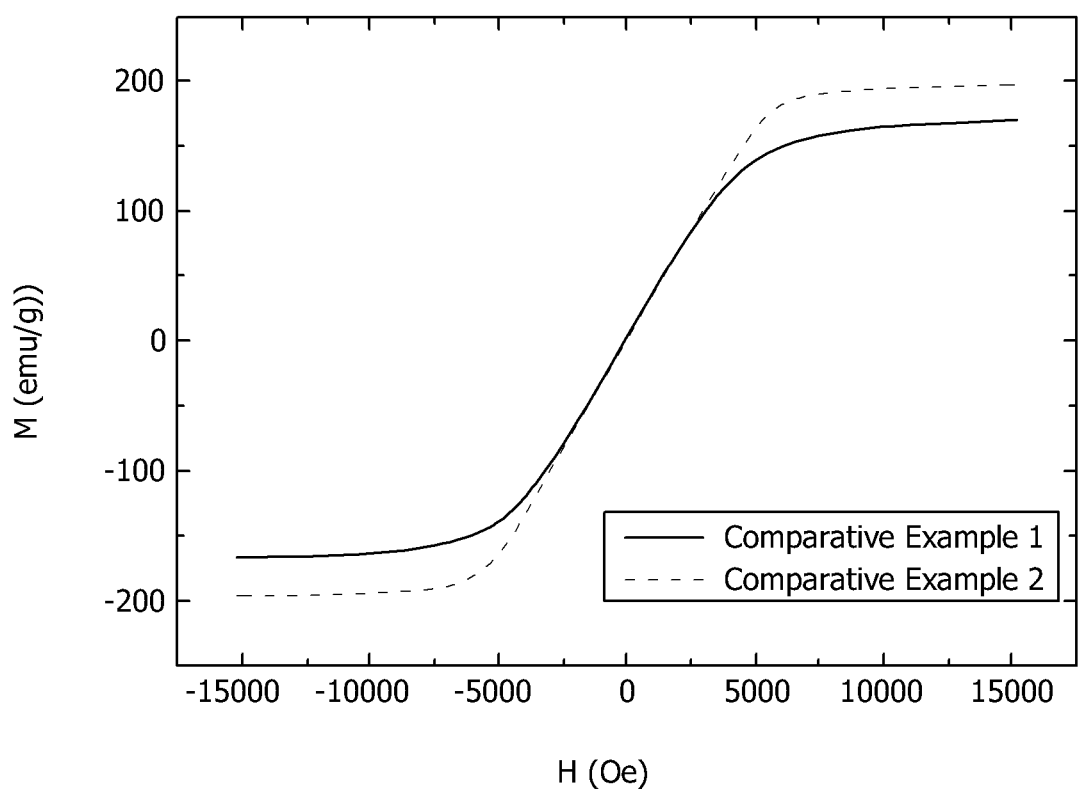
FIG. 1 is a graph illustrating saturated magnetization of a soft magnetic alloy according to an embodiment of the present invention and saturated magnetization of a normal soft magnetic alloy.

Exemplary embodiments of the present invention will be described in detail below with reference to the accompanying drawings. However, since the present invention is not limited to the embodiments disclosed hereinafter, the embodiments of the present invention can be implemented in various forms.

It will be understood that, although the terms "first," "second," etc. may be used herein to describe various elements, these elements should not be limited by these terms. These terms are only used to distinguish one element from another. Therefore, a first element, a first component, or a first section could be termed a second element, a second component, or a second section within the scope of the invention. The term "and/or" includes any and all combinations of one or more referents.

It will be understood that when an element or layer is referred to as being "connected to" or "coupled to" another element or layer, it can be connected or coupled to the other element or layer or intervening elements or layers may be present. In contrast, when an element is referred to as "directly connected to" or "directly coupled to" another element or layer, there are no intervening elements or layers present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiment of the present invention will be described in detail with reference to accompanying drawings. The same reference numerals denote the same components throughout the specification, and repeated descriptions thereof will be omitted.

A soft magnetic alloy according to an embodiment of the present invention may be expressed by a general formula $Fe_aX_bY_c$, and compositions thereof may be $84.5 \leq a \leq 91.0$, $2 \leq b \leq 9$, $3.0 \leq c \leq 12.0$, and $9.0 \leq b+c \leq 15.5$, in terms of atomic percentages. Here, X and Y represent metalloid elements.

In the soft magnetic alloy according to the embodiment of the present invention, iron (Fe) is an essential element in charge of expressing magnetic properties. When an iron content is less than 84.5 at %, a saturated magnetic flux density or a glass-forming ability of the soft magnetic alloy may be degraded. In addition, since a decrease in the content of iron, which is an inexpensive element, implies an increase in a content of a more expensive element than Fe, overall costs of raw materials may increase. Accordingly, the iron content in the soft magnetic alloy according to the embodiment of the present invention may be 84.5 at % or more. In addition, when the iron content is more than 91.0 at %, the glass-forming ability or soft-magnetic characteristics may be degraded since an amorphous status of the soft magnetic alloy becomes unstable. Accordingly, the iron content in the soft magnetic alloy according to the embodiment of the present invention may be 91.0 at % or less.

According to the embodiment of the present invention, the metalloid elements may include at least one of B, C, Al, Si, P, Ga, and Ge. When a total content of the metalloid elements in the soft magnetic alloy according to the embodiment of the present invention is less than 9.0 at %, the glass-forming ability may be degraded due to a lack of glass-forming elements. Meanwhile, when the total content of the metalloid elements in the soft magnetic alloy according to the embodiment of the present invention is more than 15.5 at %, the glass-forming ability may be degraded due to an excess of glass-forming elements, and the saturated magnetic flux density may decrease since a relative content of iron decreases. Accordingly, the content of the metalloid elements in the soft magnetic alloy according to the embodiment of the present invention may be in the range of 9.0 at % to 15.5 at %. Accordingly, since the content of the metalloid elements in the soft magnetic alloy according to the embodiment of the present invention is lower than that in a normal soft magnetic alloy, plastic deformation of a spherical powder may be available, and thus the soft magnetic alloy may be easily processed into a flake form and a ribbon form.

According to the embodiment of the present invention, since occupancy of a magnetic material in the soft magnetic alloy increases depending on the number of stacks and the number of windings, or by reducing spaces between layers, an effective saturated magnetic flux density may increase. Further, the soft magnetic alloy according to the embodiment of the present invention may have a high iron content and a high saturated magnetic flux density. Due to the high saturated magnetic flux density, when the soft magnetic alloy according to the embodiment of the present invention is used as a magnetic component of a transformer, an inductor, a noise filter, or a motor, size reduction thereof may be expected and overall costs of raw materials may be reduced due to an increase in the content of Fe, which is an inexpensive element.

In addition, since the soft magnetic alloy according to the embodiment of the present invention has a high glass-forming ability and the high saturated magnetic flux density at the same time, an amorphous bulk material having an amorphous structure may be fabricated therefrom. Accordingly, the soft magnetic alloy according to the embodiment of the present invention may be fabricated in the form of a ribbon or powder having a spherical or flake shape to be used in a magnetic core, or may be mixed with a resin or and casted in the form of a sheet to be used in a wireless power transmitting and receiving apparatus.

In the soft magnetic alloy according to the embodiment of the present invention, the metalloid element X is boron (B), and the metalloid element Y is silicon (Si).

When boron content is less than 9.65 at % or more than 22 at %, the glass-forming ability may be degraded. Accordingly, the soft magnetic alloy according to the embodiment of the present invention may include boron at 9.65 at % or more and 22 at % or less.

When silicon content is less than 3.0 at % or more than 12 at %, the glass-forming ability may be degraded. Accordingly, the soft magnetic alloy according to the embodiment of the present invention may include Si at 3.0 at % or more and 12.0 at % or less.

TABLE 1

| | Amorphous Soft Magnetic Alloy | | | | | | |
|---|---|---|---|---|---|---|---|
| | Composition (atomic %) | | | | Saturated Magnetization | Saturated Magnetic Flux Density | Resistivity |
| No. | Fe | B | Si | B/Si | (emu/g) | (T)* | (μΩ·cm) |
| Comparative Example 1 | 82 | 10.5 | 7.5 | 1.4 | 170.2 | 1.67 | 63.8 |
| Example 1 | 84.5 | 9.0 | 6.5 | 1.4 | 182.2 | 1.78 | 52.6 |
| Example 2 | 86 | 8.2 | 5.8 | 1.4 | 187.1 | 1.83 | 49.3 |
| Example 3 | 88 | 7.0 | 5.0 | 1.4 | 195.2 | 1.91 | 45.8 |
| Example 4 | 91 | 5.3 | 3.8 | 1.4 | 199.2 | 1.95 | 45.7 |
| Comparative Example 2 | 93 | 4.1 | 2.9 | 1.4 | 202.3 | 1.98 | 28.3 |
| Example 5 | 86 | 2 | 12 | 0.2 | 185.1 | 1.81 | 72.5 |
| Example 6 | 88 | 6.0 | 6.0 | 1.0 | 196.3 | 1.92 | 50.2 |
| Example 7 | 88 | 5.0 | 7 | 0.7 | 195.8 | 1.92 | 50.8 |
| Example 8 | 88 | 2 | 10 | 0.2 | 191.8 | 1.88 | 69.6 |
| Example 9 | 88 | 10 | 2 | 5.0 | 198.9 | 1.95 | 32.8 |

Referring to Table 1, the soft magnetic alloys according to Examples 1 to 9 have saturated magnetic flux densities of 1.7 T or more, and resistivity of 30μΩ·cm or more.

The soft magnetic alloys according to Examples and Comparative Examples of Table 1 were fabricated by dissolving metal powder having respective compositions at 1700° C., cooling the dissolved metal power to room temperature using a water quenching process, forming spherical powder using a gas atomizer, and fabricating flakes by performing a heat treatment on the spherical powder at a temperature in the range of 350° C. to 400° C.

Comparing Comparative Example 1 with Examples 1 to 4 in Table 1, the saturated magnetic flux density is 1.7 T or less when an iron content is 82 at % and a content of the metalloid element is 18 at %, while the saturated magnetic flux density is more than 1.7 T when the iron content is in a range of 84.5 to 91.0 at % and the content of the metalloid element is in a range of 9.1 to 15.5 at %. In addition, the resistivity of the soft magnetic alloys in Examples 1 to 4 is 30μΩ·cm or more.

Comparing Comparative Example 2 with Examples 5 to 9 in Table 1, the resistivity is 30μΩ·cm or less when the iron content is 93 at % and the content of the metalloid element is 7.0 at %, while the resistivity is more than 30μΩ·cm when the iron content is in the range of 86.0 to 88.0 at % and the content of metalloid element is in the range of 12.0 to 14.0 at %. In addition, the saturated magnetic flux density of the soft magnetic alloys in Examples 5 to 9 are 1.7 T or more.

FIG. 1 is a graph illustrating saturated magnetization of the soft magnetic alloy according to an embodiment of the present invention and saturated magnetization of a normal soft magnetic alloy.

Referring to FIG. 1, the saturated magnetization of an $Fe_{82}B_{10.5}Si_{7.5}$ soft magnetic alloy according to Comparative Example 1 is compared with that of an $Fe_{88}B_{7.0}Si_{5.0}$ soft magnetic alloy according to Example 3. It is shown that the soft magnetic alloy according to Example 3 has a higher level of saturated magnetization than the soft magnetic alloy according to Comparative Example 1.

The saturated magnetization is an inherent property of a material, and indicates how strong a magnetism of a material is. A relationship between the saturated magnetic flux density and the saturated magnetization may be represented by Equation 1 below.

$$T = 4\pi \times \sigma \times M \quad \text{[Equation 1]}$$

Wherein, T is a saturated magnetic flux density, σ is a density of a soft magnetic alloy powder, and M is saturated magnetization.

Figure 2:
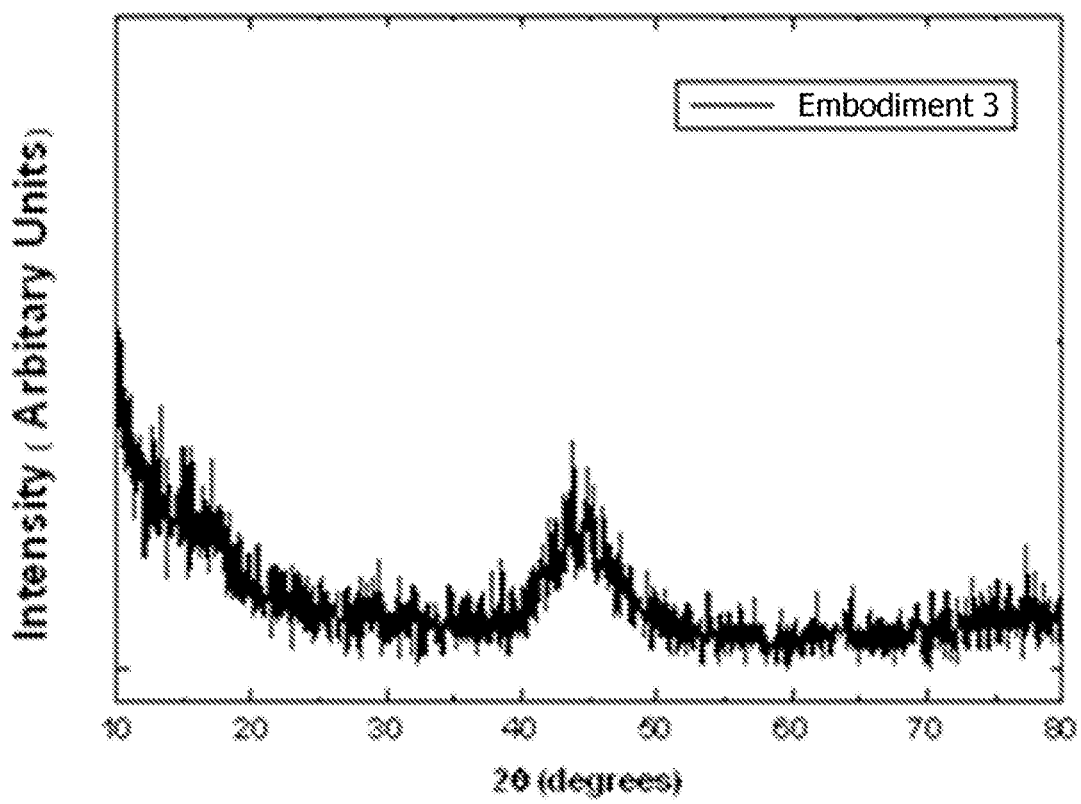
FIG. 2 is an XRD analysis graph of a soft magnetic alloy according to an embodiment of the present invention.

FIG. 2 is an XRD analysis graph of a soft magnetic alloy according to an embodiment of the present invention. FIG. 2 illustrates distributions of relative elements. It can be seen through a uniform elemental density distribution that glass performance characteristics were improved. Accordingly, the soft magnetic alloy according to the embodiment of the present invention may have a high saturated magnetic flux density, and may be easily processed into flakes. In addition, since the soft magnetic alloy according to the embodiment of the present invention can be used in a frequency band in the range of 110 kHz to 250 kHz, it may be suitable for a wireless power transmitting apparatus or a wireless power receiving apparatus of a wireless charging system.

Hereinafter, a wireless power transmitting apparatus and a wireless power receiving apparatus using a soft magnetic alloy according to an embodiment of the present invention will be described.

Figure 3:
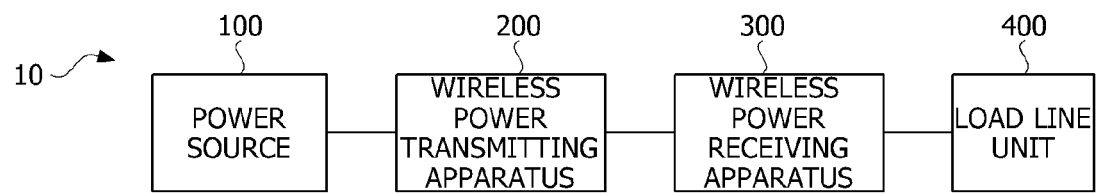
FIG. 3 illustrates a wireless charging system according to an embodiment of the present invention.

FIG. 3 illustrates a wireless charging system according to an embodiment of the present invention.

Referring to FIG. 3, a wireless charging system 10 may include a power source 100, a wireless power transmitting apparatus 200, a wireless power receiving apparatus 300, and a load line unit 400.

The wireless power transmitting apparatus 200 is connected to the power source 100 and receives power from the power source 100. In addition, the wireless power transmitting apparatus 200 may wirelessly transmit power to the wireless power receiving apparatus 300. Here, the wireless power transmitting apparatus 200 may transmit power by an electromagnetic induction method process or a resonance method. The power source 100 and the wireless power transmitting apparatus 200 are illustrated as separated components from each other in FIG. 3, but are not limited thereto. The power source 100 may be included in the wireless power transmitting apparatus 200.

The wireless power receiving apparatus 300 receives power from the wireless power transmitting apparatus 200. The wireless power receiving apparatus 300 may receive power by the electromagnetic induction method or the resonance method, too. In addition, the wireless power receiving apparatus 300 may supply the received power to the load line unit 400. The load line unit 400 may be a battery or a device in which a battery is built-in. The load line unit 400 and the wireless power receiving apparatus 300 are illustrated as separated components from each other in FIG. 3, but are not limited thereto. The load line unit 400 may be included in the wireless power receiving apparatus 300.

Figure 4:
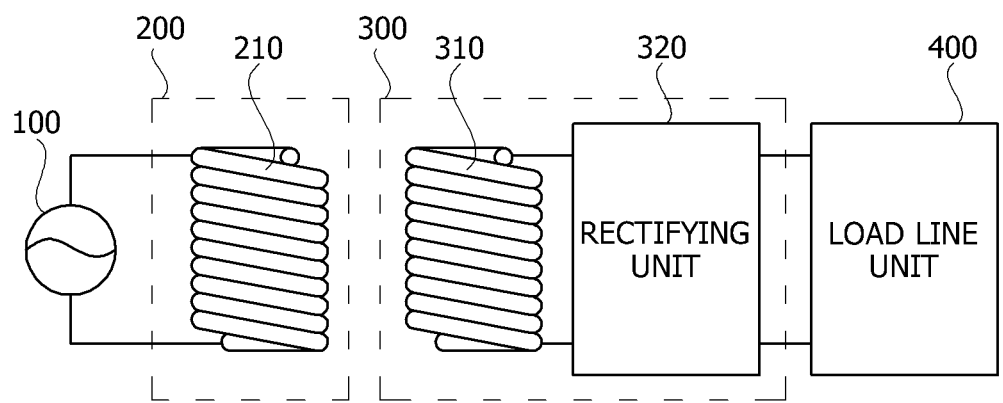
FIG. 4 illustrates a method of wirelessly transmitting and receiving power in a wireless charging system according to an embodiment of the present invention.

FIG. 4 illustrates a method of wirelessly transmitting and receiving power in a wireless charging system according to an embodiment of the present invention.

Referring to FIG. 4, a wireless power transmitting apparatus 200 may include a transmission coil 210. A wireless power receiving apparatus 300 may include a reception coil 310 and a rectifying unit 320.

The power source 100 may generate AC power having a predetermined frequency and transmit it to the transmission coil 210 of the wireless power transmitting apparatus 200.

In addition, AC currents generated in the transmission coil 210 may be transmitted to the reception coil 310 inductively coupled to the transmission coil 210. Alternatively, the AC power transmitted to the transmission coil 210 may be transmitted to the wireless power receiving apparatus 300 having the same resonance frequency as the wireless power transmitting apparatus 200 by a frequency resonance method. The power may be transmitted between two LC circuits having matched impedance by the frequency resonance method.

The power transmitted to the reception coil 310 by the electromagnetic induction method or the resonance method may be rectified by the rectifying unit 320 and transmitted to the load line unit 400.

Figure 5:
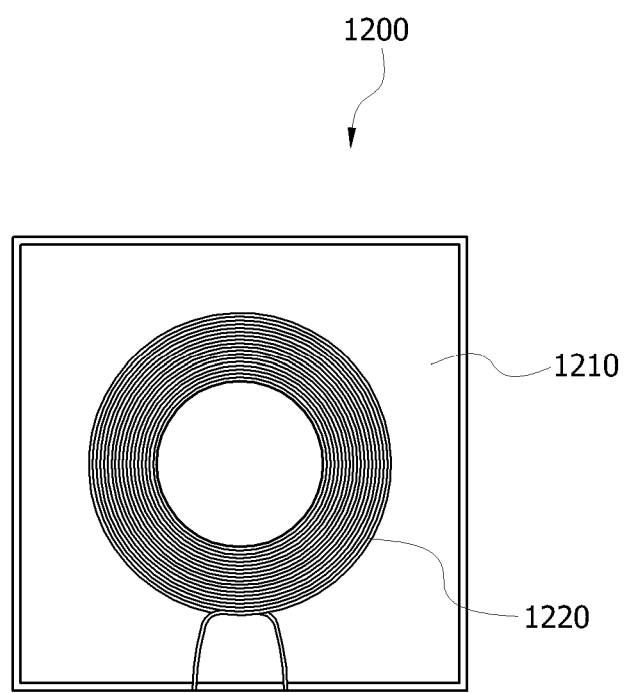
FIG. 5 illustrates a portion of a wireless power transmitting apparatus according to an embodiment of the present invention.
Figure 6:
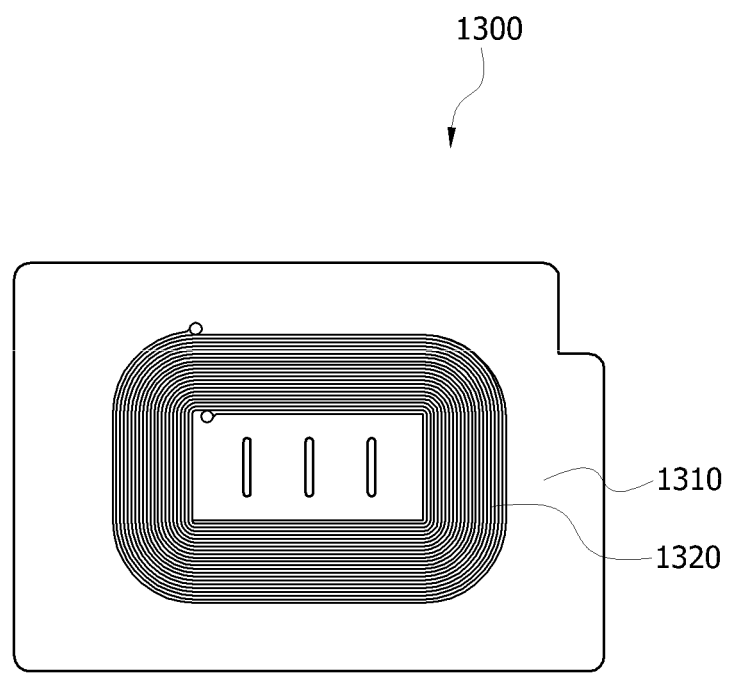
FIG. 6 illustrates a portion of a wireless power receiving apparatus according to an embodiment of the present invention.

FIG. 5 illustrates a portion of a wireless power transmitting apparatus according to an embodiment of the present invention, and FIG. 6 illustrates a portion of a wireless power receiving apparatus according to an embodiment of the present invention.

Referring to FIG. 5, a wireless power transmitting apparatus 1200 may include a soft magnetic sheet 1210 and a transmission coil 1220.

The soft magnetic sheet 1210 may be formed of a soft magnetic material having a thickness of several millimeters. In addition, the transmission coil 1220 may be disposed on the soft magnetic sheet 1210. Although not illustrated in FIG. 5, a permanent magnet may be further disposed on the soft magnetic sheet 1210. The permanent magnet may be surrounded by the transmission coil 1220.

Referring to FIG. 6, a wireless power receiving apparatus 1300 may include a soft magnetic substrate 1310 and a reception coil 1320, and the reception coil 1320 may be disposed on the soft magnetic substrate 1310.

The reception coil 1320 may be formed in a coil plane wound in a direction parallel to the soft magnetic substrate 1310 on the soft magnetic substrate 1310.

Although not illustrated in FIG. 6, when the wireless power receiving apparatus 1300 has a wireless charging function and a near field communication (NFC) function at the same time, an NFC coil may be further disposed on the soft magnetic substrate 1310. The NFC coil may be formed to surround an outer side of the reception coil 1320.

According to the embodiment of the present invention, at least one of the soft magnetic sheet 1210 of the wireless power transmitting apparatus 1200 and the soft magnetic substrate 1310 of the wireless power receiving apparatus 1300 includes a soft magnetic alloy having Formula 1.

$$Fe_aX_bY_c \quad \text{[Equation 1]}$$

Wherein, X and Y represent metalloid elements, and may include at least one of B, C, Al, Si, P, Ga, and Ge. In the soft magnetic alloy configuring at least one of the soft magnetic sheet 1210 of the wireless power transmitting apparatus 1200 and the soft magnetic substrate 1310 of the wireless power receiving apparatus 1300 according to the embodiment of the present invention, X includes boron (B), and Y includes silicon (Si).

In Formula 1, a may be in the range of 84.5 to 91.2 at %, b may be in the range of 2.0 to 9.0 at %, and c may be in the range of 3.0 to 12.0 at %.

When an iron content is more than 91.0 at % and a metalloid content is less than 9 at %, the resistivity of the soft magnetic alloy may decrease to 30μΩ·cm or less, and the coercivity of the soft magnetic alloy may increase to 40 Oe or more. In addition, when the iron content is less than 84.5 at % and the metalloid content is more than 15.5 at %, there are problems in that the saturated magnetic flux density of the soft magnetic alloy may decrease to 1.7 T or less and the coercivity of the soft magnetic alloy may increase to 40 Oe or more. When the resistivity decreases to 30μΩ·cm or less, eddy current losses may increase in a frequency band of 100 kHz or more. Since the wireless charging system uses a frequency band in the range of 100 to 250 kHz, the soft magnetic alloy having the resistivity of 30μΩ·cm or less may not be suitable for the wireless charging system. In addition, when the saturated magnetic flux density decreases to 1.7 T or less, it is difficult to form a thinned shielding material. Further, when the coercivity of the soft magnetic alloy increases to 40 Oe or more, the soft magnetic alloy may be difficult to be processed into flakes, resulting in lowering of a magnetic permeability in a planar direction.

Accordingly, in Formula 1, the iron content may be in the range of 84.5 to 91.2 at %, and the content of the metalloid element may be in the range of 9 to 15.5 at %.

The terminology "unit" used in the embodiments of the present invention represents a hardware component including a field programmable gate array (FPGA) or an application specific integrated circuit (ASIC), and executes particular operations. However, the terminology "unit" is not limitative to hardware or software. The "unit" may be configured to be stored into an addressable storage device or may be configured to operate one or more processors. For example, the "unit" may include software components, object oriented software components, class components, and task components. Further, the "unit" may also include processes, functions, attributes, procedures, subroutines, segments of program codes, drivers, firmware, microcode, circuits, data, databases, data structures, tables, arrays, and variables. Functions provided by components and "units" may be combined into a smaller number of components and "units," or further divided into additional components and "units." In addition, components and "units" may be implemented to operate one or more CPUs in a device or a security multimedia card.

As set forth above, the soft magnetic alloy according to the embodiments of the present invention has a high saturated magnetic flux density, a low AC magnetic loss, and a high magnetic stability at an operating temperature.

In addition, the wireless power transmitting apparatus and wireless power receiving apparatus including the soft magnetic alloy according to the embodiments of the present invention can be used in a high frequency band for wireless charging since the soft magnetic alloy is easily processed into flakes and has a high saturated magnetic flux density.

While the present invention has been particularly shown and described with reference to exemplary embodiments thereof, it will be apparent to those skilled in the art that the scope of the invention is given by the appended claims, rather than the preceding description, and all variations and equivalents which fall within the range of the claims are intended to be embraced therein.

What is claimed is:

1. A soft magnetic alloy, consisting of a composition expressed by a formula:

$Fe_aX_bY_c$, wherein X represents a first metalloid element, Y represents a second metalloid element and a content of the first and second metalloid elements (X+Y) is in the range of 9 to 15.5 at %, and wherein the composition consists of Fe, X, and Y, wherein the first metalloid element is B and the second metalloid element is Si, wherein a is in the range of 84.5 to 91.0 at %, b is in the range of 5.3 to 9.0 at %, and c is in the range of 3.8 to 6.5 at %, and wherein B/Si, which is a content ratio of B and Si, is 1.4 so that the amount of saturated magnetic induction of the soft magnetic alloy is in the range of 1.78~1.95 T, a resistivity of the soft magnetic alloy is in the range of 45.7~52.6μΩ·cm, and a saturated Magnetization is in the range of 182.2~199.2 emu/g so as to be used at frequency band in the range of 110 kHz~250 kHz.

2. The soft magnetic alloy of claim 1, wherein a content of the first and second metalloid elements (X+Y) is in a range of from 12.65 at % to 15.5 at %.

3. The soft magnetic alloy of claim 1, wherein the soft magnetic alloy is thermally treated by annealing at a temperature between 350° C. and 400° C.

* * * * *